United States Patent [19]

De Biasse et al.

[11] 3,709,561
[45] Jan. 9, 1973

[54] BRAKE AND WHEEL ASSEMBLY FOR MOTORCYCLES AND THE LIKE

[75] Inventors: Richard L. De Biasse, 3 Oak Street, Madison; Warren L. Harvey, P.O. Box 622, West Route 24, Mendham, both of N.J.

[73] Assignee: said De Biasse, by said Harvey

[22] Filed: Dec. 14, 1970

[21] Appl. No.: 97,595

[52] U.S. Cl. .................. 301/6 E, 301/6 V, 301/65
[51] Int. Cl. .................................... B60b 19/00
[58] Field of Search ......... 301/65, 6 E, 6 R, 79, 64 R, 301/6 V

[56] References Cited

UNITED STATES PATENTS

| 3,250,571 | 5/1966 | Richter | 301/65 |
| 3,250,572 | 5/1966 | Walker | 301/65 |
| 2,417,863 | 3/1947 | Deady | 301/6 E |
| 2,734,778 | 2/1956 | Cook | 301/65 |

FOREIGN PATENTS OR APPLICATIONS

| 810 | 1/1910 | Great Britain | 301/65 |
| 3,077 | 2/1913 | Great Britain | 301/64 |

Primary Examiner—Robert J. Spar
Attorney—Brumbaugh, Graves, Donohue & Raymond

[57] ABSTRACT

A lightweight rigid wheel assembly for motorcycles and the like. The wheel is formed in one piece and includes a relatively small number of spokes, each spoke acting to support the wheel during full rotation and being "I"-shaped in cross section. The connecting web portion of each spoke tapers from the rim toward the hub and the connected flange portions taper from the hub toward the rim. A brake disk is attached to the rim for use with a suitable brake caliper attached to the motorcycle frame.

8 Claims, 5 Drawing Figures

PATENTED JAN 9 1973

INVENTOR.
RICHARD L. DEBIASSE
WARREN L. HARVEY
BY
Brumbaugh, Graves,
Donohue & Raymond
ATTYS

PATENTED JAN 9 1973

3,709,561

INVENTOR.
RICHARD L. DEBIASSE
WARREN L. HARVEY
BY

BRAKE AND WHEEL ASSEMBLY FOR MOTORCYCLES AND THE LIKE

BACKGROUND OF THE INVENTION

This invention relates generally to wheel assemblies for motorcycles and the like. The invention has particular applicability with regard to providing a lightweight and a centrally rigid wheel for use in a motorcycle braking system. The problem this invention solves is that of providing an effective means for preventing undue bending and distortion of a motorcycle wheel, especially during braking and when rounding curves.

Conventional motorcycle wheels include a multiplicity of radial wire spokes which support a rim on a hub. The motorcycle includes a unitary frame or main body portion which is normally mounted on axles that extend through the wheel hubs. The outer ends of spokes in the lower half of a wheel are free to slide into the rim to prevent the spokes from bending due to wheel deformation. In this arrangement only spokes located in the upper half of a wheel support the weight and inertial force of the vehicle, thereby promoting further bending and distortion of the wheel. Because of this tendency to deform or to "get out of tune" the spoked wheels must necessarily be adjusted at regular intervals. Moreover, tubeless tires are precluded from being used on these wheels because of the holes in the rim which allow the spokes in the lower half of a wheel to slide into the rim.

The stress system operating in these spoke wheels is highly complicated. In essence, the rim of the wheel is maintained in concentric relation to the rotational axis of the hub only by tensile stresses developed in the spokes in the upper half of the wheel. When a motor cycle is in motion, a wheel is subject to various forces parallel to the plane of the wheel, that is a plane perpendicular to the rotational axis of the hub. These latter forces are resisted by the tensile stresses in the spokes in the upper half of the wheel and can result in a significant deformation of the rim causing it to assume a non-circular shape and in substantial displacement of the rim in its entirety from its normal position concentric to the rotational axis of the hub. Under conditions of rapid acceleration or de-acceleration the extent of wheel distortion and of rim displacement from concentricity to the rotational axis of the hub can be especially substantial.

In addition, even though various spoke arrangements have been attempted, the wire spoke system is very poorly adapted to resist deformation and deflection of the rim of the wheel relative to the hub under forces imposed on the system perpendicular to the plane of the wheel, that is parallel to the rotational axis of the wheel. When a motorcycle or other similar type of vehicle with wire spoke wheels corners at a high speed or operates under other conditions that cause a relatively high centrifugal force on the body of the vehicle relative to the wheel, the hub is deflected along its rotational axis a considerable distance relative to the wheel. The spoke system provides little resistance to such deflection. Again, because the spokes tend not to resist bending, the forces that set up in the spoke system to resist distortion of the wheel rim in a lateral direction relative to the hub operate only in tension.

Because of this lack or rigidity in a normally designed spoke wheel, particularly rigidity with regard to the relative position of the rim to the hub when the wheel is subjected to lateral loads, the braking systems normally employed in motorcycles have necessarily been located in close proximity to the hub. Accordingly, the braking forces applied to the wheel at the hub must be transmitted through the spoke system to the rim and tire resulting in the spoke system again being subjected to forces to which it normally would not be subjected if the braking forces could be applied at the rim. Moreover, a brake disk located near the hub of the wheel necessarily requires a relatively small disk diameter, thereby resulting in a relatively small braking surface. In addition, with the brake system at the wheel hub, the frame forks under heavy braking are subject to great stress. However, for conventional spoke wheels the feasibility of locating a braking system at the rim is precluded by the significant deformation of the rim relative to the forks of the motorcycle frame.

An additional disadvantage of the brake system being located in the wheel hub is that in that position the brake disk is located near a close concentration of spokes resulting in a highly disturbed air stream during wheel movement. In this arrangement the free flow of air is impeded, thereby precluding optimum cooling of a brake disk that is located near the wheel hub. In addition, because the brake disk is located in close proximity to the concentration of spokes at the wheel hub, only the side of the brake disk away from the spokes is exposed to the direct flow of cooling air. Another considerable disadvantage of the brake system being located near the hub or center of rotation of the wheel is that dirt and extraneous matter has a tendency to collect in the disk area because of its central location and resulting lower centrifugal force.

SUMMARY OF THE INVENTION

There is provided, in accordance with the invention, a novel and improved wheel that is specially adaptable for use with a new and effective braking assembly for motorcycles. The wheel is a lightweight structure of substantial rigidity in that it includes a relatively small number of spokes, each having a relatively large cross-sectional area that provides considerable resistance against bending. Considering the spoke system relative to the hub, each spoke is in essence a prestressed cantilever beam that supports the rim and resists deformation and deflection of the rim of the wheel relative to the hub. Consequently, even under a relatively high load the rim of the wheel remains substantially circular, rather than deforming out of the true circular shape, and also remains substantially concentric to the axis of the hub, even under the imposition of relatively high forces either in or lateral to the plane of the wheel.

More particularly, a preferred shape for the spoke is an I-shaped cross section formed of a connecting web portion and a pair of connected flange portions. The web portion of each spoke is preferably disposed with its major planar faces substantially perpendicular to the rotational axis of the hub, and the major planar faces of the flange portions of each spoke are substantially perpendicular to the major planar faces of the web portion. In cross section, the spokes are preferably symmetrical about both major cross-sectional axes at all points along the length of the spoke.

The web portion of each of the spokes in a wheel is tapered such that the transverse dimension of the web in its major plane, that is the plane perpendicular to the rotational axis of the hub, increases moving from the hub toward the rim. On the other hand, each flange is also tapered, decreasing in transverse dimension relative to its major plane moving from the hub toward the rim. The significance of the opposing tapering structure, as described above, is the provision of a uniform cross-sectional area along the length of each spoke, thereby maintaining a uniform tensile strength along the length of each spoke.

The tapering of the flanges with the wider portion near the hub counteracts loads transverse to the wheel, such as loads imposed on the wheel as the motorcycle is cornering. When those transverse loads occur, bending movements in the spokes develop, increasing in intensity moving from the rim toward the hub. Consequently, the greater dimension of the flange portions of the spokes nearer the hub provides increased resistance to lateral wheel deformation and greater strength in portions of the spokes nearest the hub.

The rigidity of this novel wheel, which provides greater resistance to deformation and deflection of the rim relative to the hub than does any of the known prior art devices, makes it possible to provide a brake assembly that is associated with the rim of the wheel. More particularly, a friction disk in the form of an annular plate is secured to one or both of the outermost edges of the rim, each brake disk extending circumferentially around the perimeter of the rim and, preferably, having its outer edge generally coincident with the outermost edge of the rim. The opposite surfaces of the disk are located in a plane perpendicular to the rotational axis of the wheel. Each disk extends radially inwardly a sufficient distance toward the hub from the rim to provide an optimum braking surface. Although only one brake disk need be provided, in which case it may be affixed to either one of the two edges of the rim, it may be advantageous to employ two friction brake disks, one associated with each lateral outer portion of the rim.

Associated with each brake disk is a brake caliper of any suitable form and construction that is selectively operable to engage coacting brake pads with opposite friction surfaces of the brake disk. The brake caliper is preferably mounted on a bracket that is secured to the yoke or fork in the case of the front wheel and to a suitable component of the frame for the rear wheel.

The location of the brake system in association with the rim of the wheel provides the most effective braking action possible. In this regard, the purpose of the brake, of course, is to stop rotation of the wheel relative to the body of the motorcycle. With the location in conventional motorcycles of brakes associated with the hub, the braking forces are applied to the hub and transmitted through the spokes into the rim of the wheel and then to the tire. Consequently, the spokes are subjected to the braking forces and the spoke system is subject to bending movements with the braking system. According to the invention, the braking forces are applied directly to the rim and are transmitted directly through the rim to the tire. Consequently, the stress system set up in the course of braking differs somewhat from the conventional hub-mounted braking system.

Moreover, the location of the brake disks in association with the rim of the wheel, in accordance with the invention, makes it feasible to provide a greater surface area that is swept by brake pads of the caliper element. Accordingly, there is greater opportunity for development of higher braking forces and for dissipation of heat during prolonged application of the brakes. In addition, an uninterrupted flow of cooling air to both friction surfaces is provided when the brake disk is positioned on the wheel rim, away from the high concentration of spokes as in prior art devices.

The location of the brake caliper on the yoke or other frame component, at a relatively greater distance from the hub than with the usual type of brake means, results in the reaction load during stopping exerted by the braking element on the frame of the motorcycle being imposed significantly closer to the main body portions of the frame. Consequently, the extremities of the yoke or other portion of a frame of the motorcycle that are mounted on the wheels are subjected to reduced forces and may either be of lighter construction or be of generally the same weight of construction as they would otherwise be but with the advantage of providing greater strength by reason of not being subjected to such relatively great brake element reaction forces.

Although the wheel assembly may be fabricated from multiple pieces that are assembled together by bolting, welding, riveting or the like, it is preferable to form at least the hub, spokes, and rim as a one-piece casted or forged unit, thereby to provide the unit with the integral strength and rigidity that are enabled by unitary construction. Other one-piece units comprising various components of the wheel assembly can also be used. The preferred materials for the wheel are the lightweight metals, such as aluminum and magnesium or alloys thereof. Although the wheel and brake system has been described as most suitable for motorcycles, the principles of the invention will find use in other types of wheels, such as bicycle wheels and the like.

These and other objects of this invention and advantages and capabilities will be apparent from the following description and appended claims and accompanying drawings in which:

DESCRIPTION OF THE PREFERRED EMBODIMENT

Figure 1:
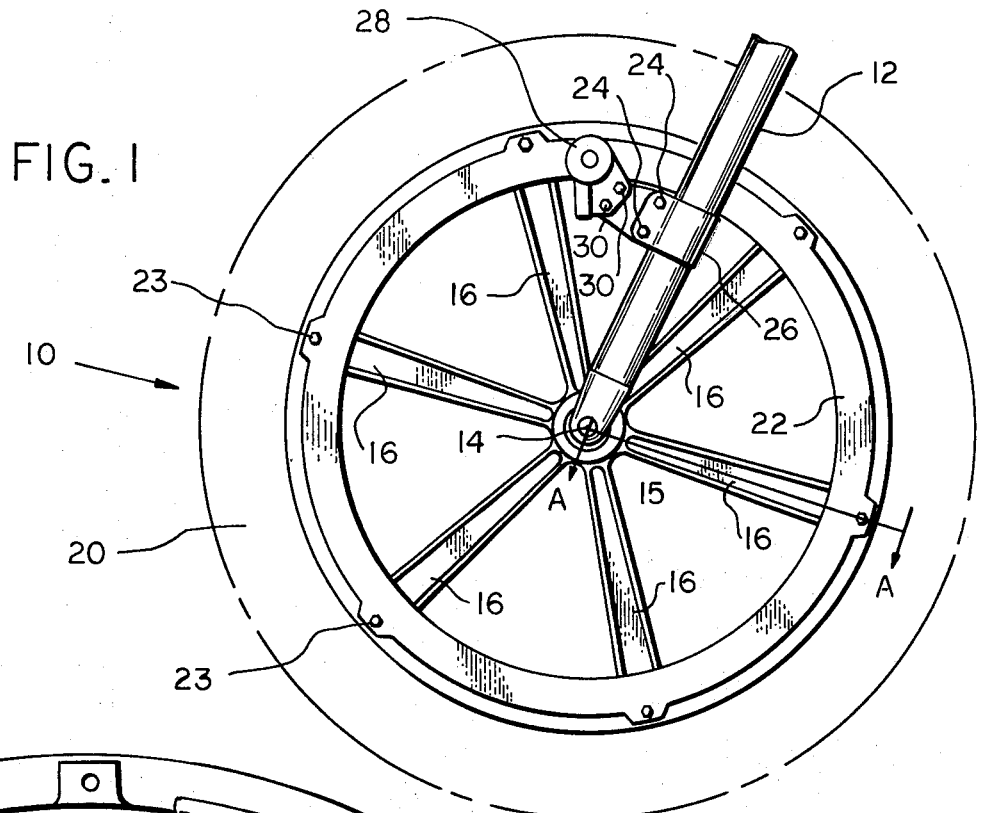
FIG. 1 is a side elevational view of a typical wheel and brake assembly on which is mounted a frame fork of a motorcycle.

In FIG. 1, the overall wheel assembly is generally designated by reference numeral 10. A motorcycle frame (not shown) which includes frame fork or yoke 12 is mounted on axle 14 of the wheel assembly 10. Axle 14 is the rotational center of wheel assembly 10 and is housed in hub 15. Radiating outwardly from hub 15 and integral therewith are spokes 16 which connect to and support rim element 18 (shown best in FIG. 3) on which is received tire 20. Hub 15, spokes 16, and rim element 18 are preferably casted or forged as a one-piece unit, but other variations can be utilized, such as fabricating the wheel assembly from multiple pieces. Connecting to and extending inwardly toward the hub from one or both edges of rim 18 is brake disk 22, which will be described in more detail below.

Attached to one or both of the arms (not numerically designated) of frame fork or yoke 12 by means of bracket bolts 24 is brake bracket 26. Generally designated by numeral 28 is a brake caliper that is attached to brake bracket 26 by means of caliper bolts 30. Brake caliper 28 is positioned in engaging relation to brake disk 22 and is selectively actuated by means of a suitable hydraulic braking system (not shown).

Figure 2:
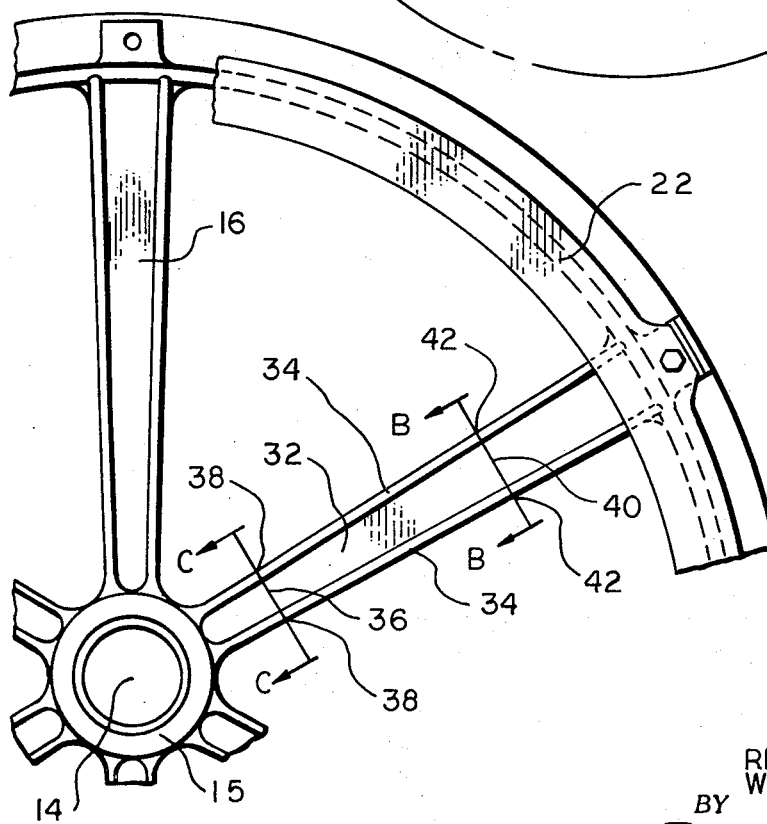
FIG. 2 is a partial side elevational view of the wheel and brake assembly shown in FIG. 1, with emphasis on the removable brake disk.
Figure 3:
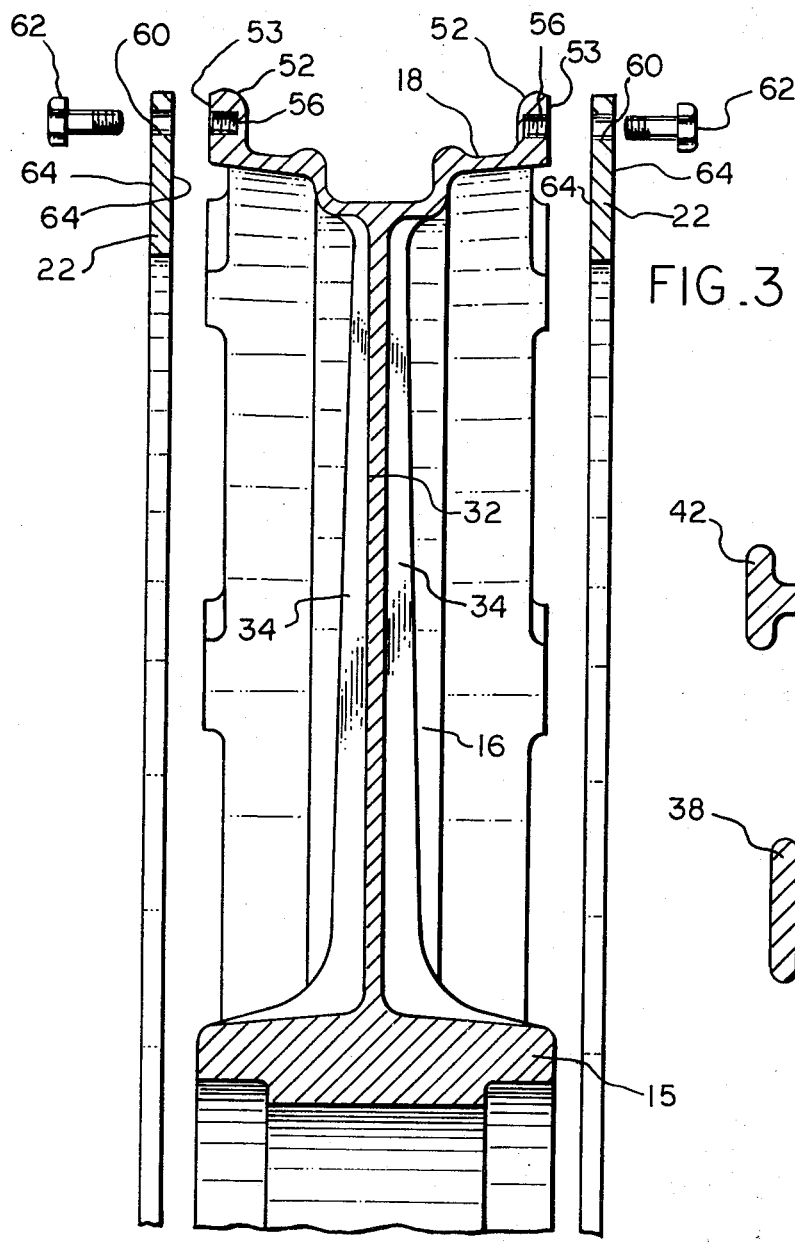
FIG. 3 is a fragmentary sectional view along line A—A as shown in FIG. 1, with the brake disks being separated from the unitary main body section.
Figure 4:
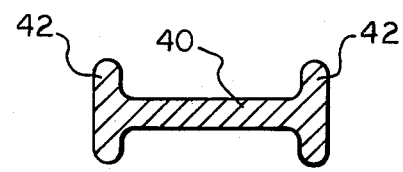
FIG. 4 is a fragmentary sectional view along line B—B as shown in FIG. 2.
Figure 5:
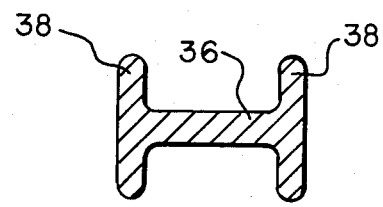
FIG. 5 is a fragmentary sectional view along line C—C as shown in FIG. 2.

As best shown in FIGS. 2 and 3, spokes 16 include a web portion 32 whose major planar faces (not numerically designated) are substantially perpendicular to the rotational axis (not shown) of hub 15. Extending along the opposite edges of web portion 32 are flange portions 34 both of whose major planar faces (not numerically designated) are substantially parallel to each other and are substantially perpendicular to the major planar faces of web portion 32. As best illustrated in FIGS. 4 and 5 this arrangement results in the spokes 16 assuming an "I"-shaped cross section that is substantially symmetrical about its principal cross-sectional axes (not shown).

As best illustrated in FIG. 2, web portion 32 tapers in width from the rim element 18 to hub 15, thereby decreasing the transverse dimension of web 32 from rim element 18 toward hub 15. In order to provide a substantially uniform cross-sectional area throughout the entire length of spokes 16 and to maintain a uniform tensile strength along the length of each spoke, the flange portions are correspondingly tapered in width from the hub 15 toward the rim element 18, thereby decreasing the transverse dimension of the flange portions 34 from the hub 15 to the rim element 18. The uniform cross-sectional area is best illustrated by comparing FIG. 4 which is the view along section B—B of FIG. 2, with FIG. 5 which is the view along section C—C of FIG. 2. Numeral 36 designates a portion of web member 32 that is narrower in relation to a portion of the web number 32 more remote from hub 15 and designated by numeral 40. In like manner, numeral 42 designates a portion of flange members 34 that is narrower, due to the tapering effect, than the portion of the flange members 34 designated by numeral 38.

Rim element 18 is shown as an integral part of the one-piece forged or casted unit that also comprises hub 15 and spokes 16. The outer surfaces (not numerically designated) of rim element 18 generally run parallel to the rotational axis of hub 15. As part of the outer edges of rim element 18 and integral therewith are annular tire flanges 52 that extend outwardly away from the rotational axis of hub 15. Tire flanges 52, together with the upper major surfaces of rim element 18, define the surface on which tire 20 is received. A plurality of internally-threaded holes 56 are included in either or both of the outer edges 53 of rim element 18. Attached to either or both outer edges 53 of rim element 18 is annular brake disk 22, in which is included a plurality of holes 60 corresponding to threaded holes 56, through which disk bolts 62 are inserted and screwed into threaded hole 56, thereby firmly securing annular brake disk 22 to rim element 18. The two major opposing surfaces of annular brake disk 22 act as friction surfaces 64, which are engaged by brake pads 56 as previously described.

It is obvious from these two embodiments of wheel assembly 10 that other suitable unitary constructions can be used, and are so contemplated by this invention.

In operation, after the overall wheel assembly has been fabricated with brake disks 22 attached thereto, and tire 20 is placed thereon, the fork or yoke 12 of the motorcycle frame (not shown) is mounted on the wheel assembly 10 by means of axle 14 which is inserted through hub 15. With regard to the forces in the plane perpendicular to the rotational axis of hub 15, each of spokes 16 by being prestressed rigid structures each help to support wheel assembly 10 at all times during wheel rotation. For counteracting bending moments in the spokes developed when the motorcycle is cornering or the like, the wider portions of flange members 34, which taper in width from hub 15 toward rim element 18, are nearest hub 15 for providing greater resistance to lateral deformation. By inversely tapering webs 32 relative to flanges 34, a uniform cross-sectional area is maintained throughout the spoke length thereby avoiding any loss in spoke strength near the portion of a spoke at which flanges 34 are relatively narrow.

With brake disks 22 being attached to the rim of wheel assembly 10, as opposed to being near hub 15, a much larger braking surface is provided that is located away from the forces that tend to disturb the stream of cooling air. The braking force is applied directly to the rim instead of through the spokes. In this manner, more effective braking and more efficient cooling of the braking surface is accomplished.

While the invention has been described in connection with a preferred embodiment, it will be understood that the motorcycle wheel assembly is capable of further modification and that this application is intended to cover any variations, uses, or adaptations of the invention. This application further contemplates such departures from the present disclosure as come within known or customary practice in the art to which the invention pertains and to which may be applied to the essential features hereinbefore set forth that fall within the scope of the invention or the limits of the appended claims.

I claim:

1. In a motorcycle having a bifurcated wheel-carrying member straddling a wheel, a wheel assembly comprising a hub, a rim element receiving a tire thereon, a plurality of spoke elements radiating from the hub and supporting the rim element, each of the spoke elements including a connecting web portion and further including connected flange portions extending along opposite edges of the web portion, the planar section of the web portion of each spoke element being substantially coplanar with the medial plane of the rim element and tapering in width substantially symmetrically about a radial axis of the wheel from the rim element to the hub thereby decreasing the transverse dimension of the web portion from the rim element to the hub, and the planar section of each of the flange portions of each of the spoke elements tapering in width substantially symmetrically about the plane of the web portion from the hub to the rim element thereby decreasing the transverse dimension of the flange portions from the hub to the rim element.

2. A wheel assembly in accordance with claim 1, wherein the rim element, hub, and spoke elements are integral components of a one-piece body.

3. A wheel assembly in accordance with claim 1, wherein the cross-sectional area of each of the spoke elements is substantially uniform along the length of the spoke.

4. A wheel assembly in accordance with claim 1, wherein at least one brake disk is attached to the rim element.

5. A wheel assembly in accordance with claim 4, wherein a brake disk is attached to each edge of the rim element.

6. A wheel assembly in accordance with claim 4, wherein the outer circumferential edge of the brake disk is generally coincident with the outer circumferential portion of the rim edge and the brake disk extends inwardly toward the hub from the rim element.

7. A wheel assembly according to claim 5 and further comprising a brake caliper mounted on each leg of the bifurcated wheel-carrying member adjacent each brake disc and in operable engagement therewith.

8. A wheel assembly in accordance with claim 1 and further comprising a brake disc attached to at least one side of the rim element and a brake caliper mounted on the bifurcated wheel-carrying member adjacent the brake disc and in operable engagement therewith.

* * * * *